US011373166B1

(12) United States Patent
Maeng

(10) Patent No.: US 11,373,166 B1
(45) Date of Patent: **\*Jun. 28, 2022**

(54) BINDING MOBILE WALLET ELEMENTS WITH PAYEES

(71) Applicant: Wells Fargo Bank, N.A., San Francisco, CA (US)

(72) Inventor: Joon Maeng, Newcastle, WA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 189 days.

This patent is subject to a terminal disclaimer.

(21) Appl. No.: 16/778,364

(22) Filed: Jan. 31, 2020

Related U.S. Application Data

(63) Continuation of application No. 15/177,989, filed on Jun. 9, 2016, now Pat. No. 10,572,870.

(51) Int. Cl.
*G06Q 20/32* (2012.01)
*G06Q 20/20* (2012.01)
*G06Q 20/36* (2012.01)
*G06F 16/951* (2019.01)

(52) U.S. Cl.
CPC ....... *G06Q 20/3278* (2013.01); *G06F 16/951* (2019.01); *G06Q 20/20* (2013.01); *G06Q 20/36* (2013.01)

(58) Field of Classification Search
CPC .................................................... G06Q 40/00
USPC ......................................................... 705/38
See application file for complete search history.

(56) References Cited

U.S. PATENT DOCUMENTS 7,099,850 B1\* 8/2006 Mann, II ................ G06Q 20/16
380/28
7,689,508 B2\* 3/2010 Davis ..................... G06Q 20/40
705/39
8,452,654 B1\* 5/2013 Wooters ............. G06Q 30/0234
705/14.34

(Continued)

FOREIGN PATENT DOCUMENTS

EP          2626823 A1     8/2013

OTHER PUBLICATIONS

"U.S. Appl. No. 15/177,989, Advisory Action dated Jan. 18, 2019", 3 pgs.

(Continued)

*Primary Examiner* — Kirsten S Apple
(74) *Attorney, Agent, or Firm* — Schwegman Lundberg & Woessner, P.A.

(57) ABSTRACT

Methods and systems are disclosed for binding a payment element in a mobile wallet operating on a mobile device with a payee. The mobile wallet, can for example, receive an indication from a point of sale (POS) device that a transaction has been completed with a payee associated with the POS device, using a payment element of the mobile wallet. The mobile wallet can query a payment database table with an identifier for the payee and an identifier for the payment element to determine if the payment element has previously been used to complete transactions with the payee. The mobile wallet can bind the payment element to the payee if the payment element has previously been used to complete transactions with the payee and if the payment element is to be bound to the payee. Other systems, methods and apparatuses are also described.

21 Claims, 8 Drawing Sheets

(56) References Cited

U.S. PATENT DOCUMENTS

| | | | |
|---|---|---|---|
| 8,583,549 B1* | 11/2013 | Mohsenzadeh | G06Q 30/0238 705/39 |
| 8,606,640 B2* | 12/2013 | Brody | G06Q 30/0613 705/26.1 |
| 8,793,184 B2 | 7/2014 | Lakshminarayanan | |
| 8,972,286 B2 | 3/2015 | Grigg | |
| 2002/0026423 A1 | 2/2002 | Maritzen et al. | |
| 2004/0122685 A1* | 6/2004 | Bunce | G06Q 20/12 705/67 |
| 2005/0250538 A1* | 11/2005 | Narasimhan | G07F 7/0886 455/558 |
| 2006/0208065 A1* | 9/2006 | Mendelovich | G06Q 30/02 235/380 |
| 2007/0255564 A1* | 11/2007 | Yee | G10L 17/24 704/246 |
| 2010/0191570 A1* | 7/2010 | Michaud | G06Q 30/0204 705/7.33 |
| 2010/0205091 A1* | 8/2010 | Graziano | G06Q 20/24 705/40 |
| 2011/0201306 A1* | 8/2011 | Ali Al-Harbi | G06Q 20/3223 455/411 |
| 2012/0124676 A1 | 5/2012 | Griffin et al. | |
| 2012/0271712 A1* | 10/2012 | Katzin | G06Q 20/20 705/14.51 |
| 2013/0013499 A1 | 1/2013 | Kalgi | |
| 2013/0024364 A1 | 1/2013 | Shrivastava et al. | |
| 2013/0030934 A1* | 1/2013 | Bakshi | G06Q 20/425 705/18 |
| 2013/0080230 A1 | 3/2013 | Fisher | |
| 2013/0110658 A1* | 5/2013 | Lyman | G06Q 20/327 705/18 |
| 2013/0166332 A1* | 6/2013 | Hammad | G06Q 20/12 705/5 |
| 2014/0164082 A1* | 6/2014 | Sun | G06Q 30/02 705/14.16 |
| 2014/0244365 A1* | 8/2014 | Price | G06Q 20/326 705/13 |
| 2014/0279566 A1 | 9/2014 | Verma et al. | |
| 2014/0337175 A1 | 11/2014 | Katzin et al. | |
| 2014/0365355 A1 | 12/2014 | Shvarts | |
| 2015/0058146 A1 | 2/2015 | Gaddam et al. | |
| 2015/0073926 A1 | 3/2015 | Royyuru et al. | |
| 2015/0220924 A1* | 8/2015 | Bakker | G06Q 20/327 705/14.27 |

OTHER PUBLICATIONS

"U.S. Appl. No. 15/177,989, Appeal Brief filed Jun. 21, 2019", 13 pgs.

"U.S. Appl. No. 15/177,989, Decision of Pre-Appeal Brief Request dated Mar. 21, 2019", 2 pgs.

"U.S. Appl. No. 15/177,989, Final Office Action dated Oct. 5, 2018", 10 pgs.

"U.S. Appl. No. 15/177,989, Non Final Office Action dated May 18, 2018", 9 pgs.

"U.S. Appl. No. 15/177,989, Notice of Allowance dated Oct. 17, 2019", 8 pgs.

"U.S. Appl. No. 15/177,989, Pre-Appeal Brief Request filed Feb. 5, 2019", 3 pgs.

"U.S. Appl. No. 15/177,989, Response filed Jan. 2, 2019 to Final Office Action dated Oct. 5, 2018", 10 pgs.

"U.S. Appl. No. 15/177,989, Response filed Aug. 20, 2018 to Non Final Office Action dated May 18, 2018", 9 pgs.

* cited by examiner

| Payee | Payee ID | Payment Element | Count |
|---|---|---|---|
| Payee #1 | 2334892721JDK | Credit card #2 | 1 |
| Payee #2 | 2938R42JFJW38 | Debit card #4 | 10 |
| Payee #3 | 3K203N3K23 | Credit card #3 | 15 |
| Payee #4 | 332083027J | Checking account #1 | 2 |
| Payee #5 | 234293048320 | Debit Card #2 | 3 |
| Payee #1 | 2334892721JDK | Credit card #3 | 4 |
| Payee #3 | 3K203N3K23 | Credit card #2 | 17 |

FIG. 3

| Payee | Payee ID | Payment Element | Payment method | Total spending | Total Rewards | Change payment account |
|---|---|---|---|---|---|---|
| Payee #1 | 2334892721JDK | Credit card #2 | Auto | $1,560.00 | $24.50 | Change |
| Payee #2 | 2938R42FJW38 | Debit card #4 | Quick | $230.50 | $0.00 | Change |
| Payee #3 | 3K203N3K23 | Credit card #3 | Quick | $67.80 | $1.30 | Change |
| Payee #4 | 332083027J | Checking account #1 | Auto | $567.55 | $0.00 | Change |
| Payee #5 | 23429304832O | Debit Card #2 | Quick | $0 | $0.00 | Change |
| Total | | | | $2557.50 | $56.54 | |

*FIG. 7*

BINDING MOBILE WALLET ELEMENTS WITH PAYEES

CROSS-REFERENCE TO RELATED APPLICATION

This application is a continuation of U.S. patent application Ser. No. 15/177,989, filed Jun. 9, 2016, which is incorporated by reference herein in its entirety.

TECHNICAL

Embodiments described herein generally relate to mobile wallets. Some embodiments relate to correlating or otherwise associating payees with payment elements within a mobile wallet.

BACKGROUND

Mobile or digital wallets can allow consumers to make payments for products and services with mobile computing devices instead of cash, credit cards or checks. Using an antenna in the mobile device, mobile wallets can communicate with contactless readers using radio frequency identification (RFID) such as near field communication (NFC). Mobile wallets can allow consumers to make secure payments in a relatively quick manner by placing their mobile devices near contactless readers at stores. Mobile wallets can also be used to make purchases within applications on mobile devices and over the internet.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings, in which:

FIG. 3 illustrates a payment database table for tracking and counting payments, according to various examples;

FIG. 7 illustrates an example database table for relating payees and payment elements bound to respective payees, according to various examples.

DETAILED DESCRIPTION

Financial institution customers today lead active lifestyles and appreciate flexibility in the methods in which they can provide payments. One way in which payment flexibility can be enhanced is through usage of mobile wallets. Mobile wallets include many payment elements (also referred to herein as "elements"). For example, some payment elements can include credit cards, debit cards, bank accounts, prepaid accounts, cryptocurrency, or other types of payments and accounts for electronic commerce. Users can use payment elements to perform mobile wallet transactions with payees, such as merchants.

Figure 1:
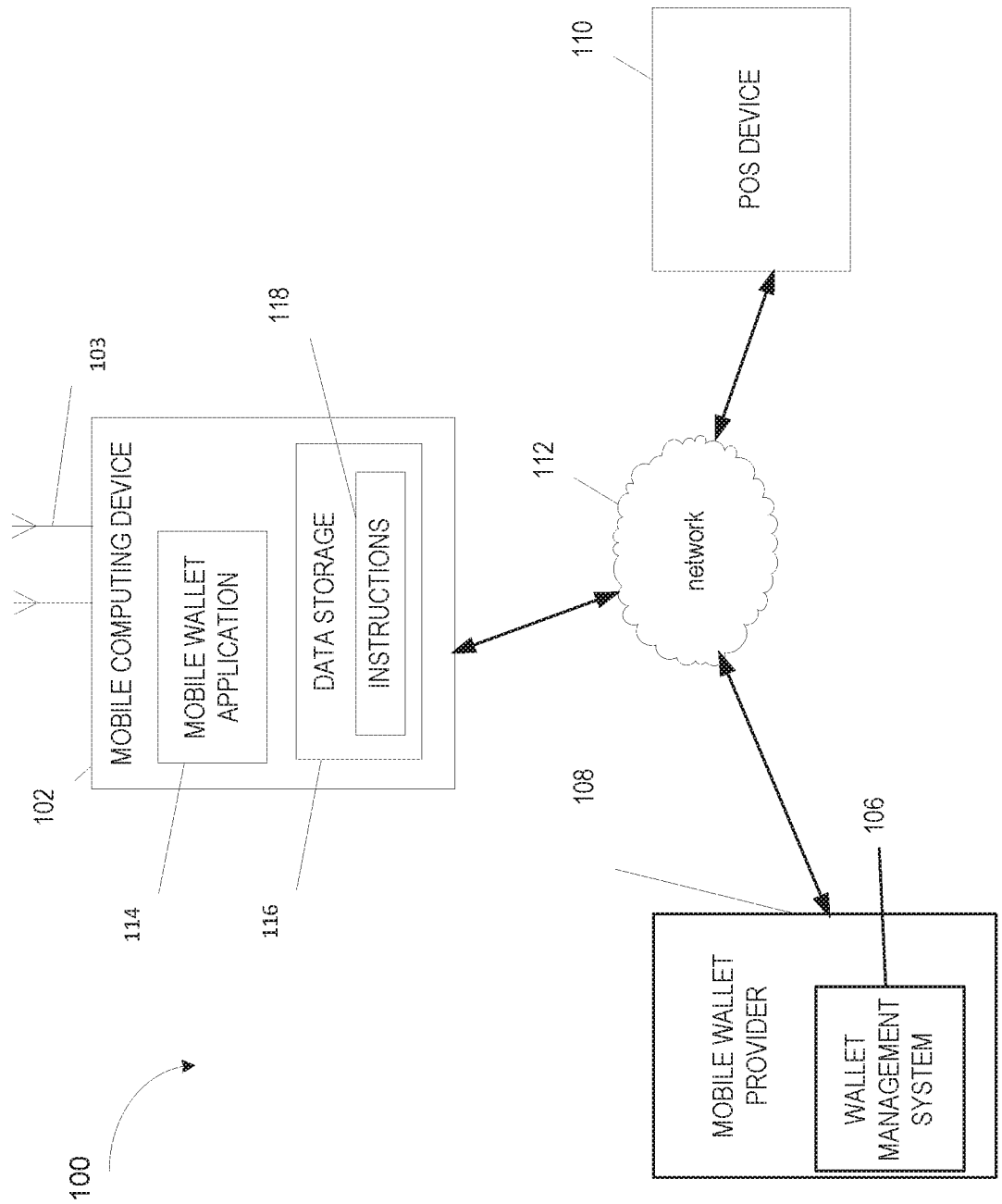
FIG. 1 illustrates an example environment for mobile wallet transactions, according to various examples.

FIG. 1 illustrates an example environment 100 for mobile wallet transactions, according to various examples. The environment 100 includes a mobile computing device 102, a wallet management system 106 provided by a mobile wallet provider 108, and a point of sale (POS) device 110. The mobile computing device 102, the mobile wallet provider 108, and the POS device 110 can communicate over a network 112.

The mobile computing device 102 can be any computing device suitable for executing a mobile wallet application 114. Example mobile computing devices 102 can include smart phones, tablet computers, laptop computers, smart watches or other wearable devices, etc. The mobile computing device 102 can include at least two antennas 103 capable of performing the same or different types of communication. For example, one antenna 103 can be used for near field communication (NFC) while another can be used for cellular communications and/or WiFi and/or Bluetooth. The mobile wallet application 114 (sometimes referred to herein as a mobile wallet), can be executed by a processing unit (not shown in FIG. 1) of the mobile computing device 102. Example mobile wallet applications include those provided by Apple Pay, PayPal, Visa Pay, Google Wallet, Samsung Pay, and Starbucks Mobile App.

The mobile computing device 102 can comprise data storage 116 to store data for executing the mobile wallet 114 as described herein. For example, the data storage 116 can store mobile wallet instructions 118. The processing unit can execute the mobile wallet instructions to implement the mobile wallet 114. The data storage 116 can also store other data for the mobile wallet 114 including, for example, a database or database table relating payees to payment elements as described in more detail below with respect to FIG. 3 and FIG. 7, or these databases and database tables can be stored remote in memory storage of the mobile wallet provider 108.

The wallet management system 106 is shown to be associated with the mobile wallet provider 108. The mobile wallet provider 108 can be any suitable provider that provides and/or maintains the mobile wallet 114. The mobile wallet provider 108 can be a financial institution, software company, or any other organization providing and maintaining the mobile wallet 114. The wallet management system 106 can comprise one or more computing devices, such as servers, programmed to operate as described herein. Computing devices making up the wallet management system 106 can be located at a single geographic location and/or can be distributed across multiple geographic locations. In some examples, the wallet management system 106 can be implemented in a "cloud computing" environment or as a "software as a service" (SaaS). For example, at least some of the operations of the wallet management system 106 can be performed by a group of computing devices, with these operations being accessible via a network, such as the network 112, and/or via one or more appropriate interfaces (e.g., an Application Program Interface (API)).

The POS device 110 can be a device associated with a merchant or online store that accepts a payment from the mobile wallet 114. The POS device 110 can comprise a processing unit and various other computing components. In some examples, the POS device 110 can be or comprise a computing device configured, for example, according to one or more of the hardware or software architectures described herein. The POS device 110 can be configured to communicate with the mobile wallet 114 using any suitable contact or a contactless medium. For example, the mobile wallet 114 can communicate with the POS device by physical contact. In some examples, the POS device 110 can be configured to communicate with the mobile wallet 114 utilizing a short-range communication medium such as, a Bluetooth connection, a Bluetooth low energy (LE) connection, an NFC connection, an infrared connection, etc.

The network 112 can be or comprise any suitable network element operated according to any suitable network protocol. For example, one or more portions of network 112 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, NFC, a WiFi network, a WiMax network, another type of network, or a combination of two or more such networks. A POS device 110 and mobile computing device 102 can communicate over a separate network 112 than that used for communication between the POS device 110 and the mobile wallet provider 108.

The mobile wallet 114 can initiate a payment with a POS device 110 associated with a payee of the payment. In some examples, the mobile wallet 114 can first determine whether it is online or otherwise in communication with the wallet management system 106. If the mobile wallet 114 is in communication the wallet management system 106, the mobile wallet 114 can initiate the payment in conjunction with the wallet management system 106. For example, the mobile wallet 114 can request that the wallet management system 106 provide an element credential either to the POS device 110 and/or to the mobile wallet 114 for provision to the POS device 110.

Mobile wallet 114 users can choose a payment element in their mobile wallets 114 each time a payment is made. The users can then review transactions processed by the payment element to calculate total spending with a particular merchant. Choosing a payment element for each transaction can be a time-consuming and error-prone process. Embodiments provide methods to help streamline the process of choosing payment elements by associating (or "binding") the payment elements with merchants and other payees.

In accordance with embodiments described herein, a mobile wallet 114 can track payments to a payee and present a user interface to a user to bind a payment element with a payee if the user keeps using the same payment element with the payee. In some embodiments, mobile wallet 114 users can manually bind a payment element with a payee regardless of whether the mobile wallet 114 user has previously used a payment element with that payee. The user can bind a payment element as being appropriate for automatic payment or quick payment and the user can include location dependency in binding the payment element. The mobile wallet 114 can access a database or other records as described later herein with respect to FIG. 3 to check if a payment element was used with a payee before, and the mobile wallet 114 can update or add to that database when transactions are made.

Figure 2:
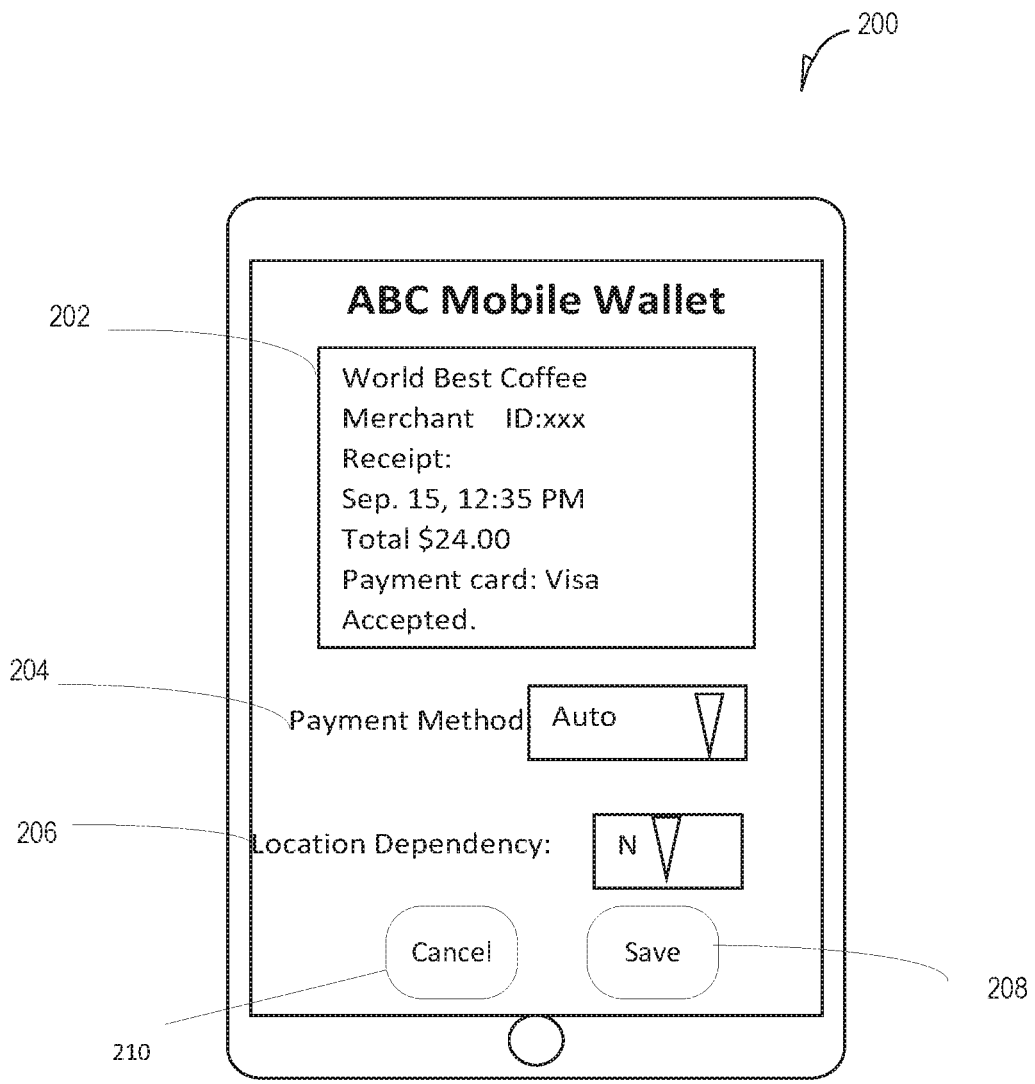
FIG. 2 is an example of a user interface (UI) for binding a payment element, according to various examples.

FIG. 2 is an example of a UI 200 for binding a payment element, according to various examples. When the mobile wallet 114 determines that a payment element is to be bound to a payee, according to methods and criteria described later herein, the mobile wallet 114 displays the UI 200. For example, the mobile wallet 114 (FIG. 1) can track and count payments at a payee by updating, adding, or writing to entries in a payment database table 300 (FIG. 3), stored in the data storage 116 or remotely, and present the UI 200 based on that count as described below.

A mobile wallet 114 can identify the payee in various ways. For example, in some embodiments, mobile wallet 114 can communicate with a POS device 110 and identify the payee from the data provided through or by the POS device 110 (e.g., invoices). In some embodiments, the mobile wallet 114 can identify the payee by obtaining the location information of the store (e.g., the payee) and associating that location information with the store/payee. The mobile wallet 114 can obtain location information for the store using a GPS in the mobile device, through communicating with a store tag (e.g., RFID) that may be located in a store, or by accessing wireless services such as WiFi provided by the store, by way of example.

FIG. 3 illustrates a payment database table 300 for tracking and counting payments, according to various examples. The payment database table 300 can be stored on a mobile computing device, a mobile wallet provider, or a financial institution server, among others. The payment database table may be store in more than one location, in some examples. The various copies of the database may be periodically synced (e.g., one location may act as a master version).

A user can use one or more payment elements 304 at one or more payees 302. The mobile wallet 114 can update the count field 306 whenever a payment element 304 is used at a payee 302. The count field 306 can represent the number of transactions that have been completed with the payee, using the payment element 304. For example, the next time the user uses "credit card #2" at Payee #1, the count field 306 will be incremented from 1 to 2. When a new credit card or other payment card is used to perform a transaction at a payee 302 already included in the payment database table 300, an additional row can be added to the payment database table 300 that relates the new payment element 304 (e.g., the new credit card or other payment card) to a payee 302.

The payment database table 300 can also include a payee identifier field 303. In some embodiments, the payee identifier field 303 can be populated the first time a transaction or payment is made to a payee, for example when the mobile wallet 114 discovers or interfaces with the POS device 110 over a secure channel and requests identifier information from the POS device 110. In some embodiments, the POS device 110 can communicate with a merchant server, which can be remote or local to the location of the POS device 110, and which implements retail applications for interacting with the mobile wallet 114 to retrieve identifier information or other information. This identifier information can include an identifier assigned to the POS device 110, bank account information for the payee, or other information. When a new payee receives a payment using a payment element 304 already included in the payment database table 300, an additional row can be added to the payment database table 300 that relates the new payee 302 to a payment element 304. Also at this time, the payee identifier field 303 can be populated for that new payee.

Other fields can also be stored in the payment database table 300. For example, a percentage use column can track how often a certain payment method is used with respect to the total number of transactions for a payee. This can allow more complex calculations to be made before a payment element is bound to a payee. For example, an automatic binding can occur when an element is used 60% of the time when at least 20 transactions have been completed with a payee.

The mobile wallet 114 can access the payment database table 300 (or the binding database table 700, described later herein) using queries (e.g., structured query language (SQL) queries. These SQL queries can be constructed based on one or both of the payee 302 and payment element 304 to determine whether a payment element 304 has been previously used to pay a payee 302, and the number of times (e.g., the count 304) that the payment element 304 has been previously used to pay a payee 302. The payee 302 column can be a foreign key that references another database table (not shown in FIG. 3), for example a fraud alert database table stored at a financial institution or other remote storage. The payment element 304 column can also be a foreign key that references another database table such that the mobile wallet 114 can access any history, alerts, or other data stored on the mobile wallet 114 or in other storage, related to either or both of the payee 302 and payment element 304.

Referring again to FIG. 2, the mobile wallet 114 can present the UI 200 when the count retrieved from the payment database table 300 reaches a predetermined value (e.g., 10 times). However, in some embodiments, the mobile wallet 114 user can manually cause the UI 200 to be displayed regardless of the count. The UI 200 can include payment information 202. Payment information 202 can include a payee name, unique payee ID, product name and price, date for a purchase, a name for the payment card being used (e.g., VISA), etc.

The user interface 200 can also include a menu 204 to select a payment method, a menu 206 to enable location dependency, a save button 208 and a cancel button 210. The payment method can include, for example, automatic payment, quick payment, etc. In the context of embodiments described herein, an automatic payment operation provides for submitting payment to the POS device 110 automatically when the user is at the POS device 110 (or within a predetermined radius of the POS device 110) for a relevant payee. A quick payment operation, in the context of embodiments described herein, presents the bound payment element for the user to confirm before submitting a payment to the POS device 110.

The location dependency menu 206 allows the user to select the payment method depending on the location of the store where payment is being made. For instance, with reference to the example illustrated in FIG. 2, the user can bind "World Best Coffee" and "VISA card" to use automatic payment for a particular location visited frequently. If the user visits another World Best Coffee store, the mobile wallet 114 does not submit the VISA card automatically because the location is different from the coffee store he visits frequently.

Users can also set other preferences, not shown in FIG. 2. For example, the user can set spending limits for payments to payees, or spending limits for automatic payments to payees, etc. The mobile wallet 114 can produce an alert when total spending reaches the spending limit. In some embodiments, the user can decide not to bind the respective payment element to the payee by selecting a cancel button 210.

Figure 4:
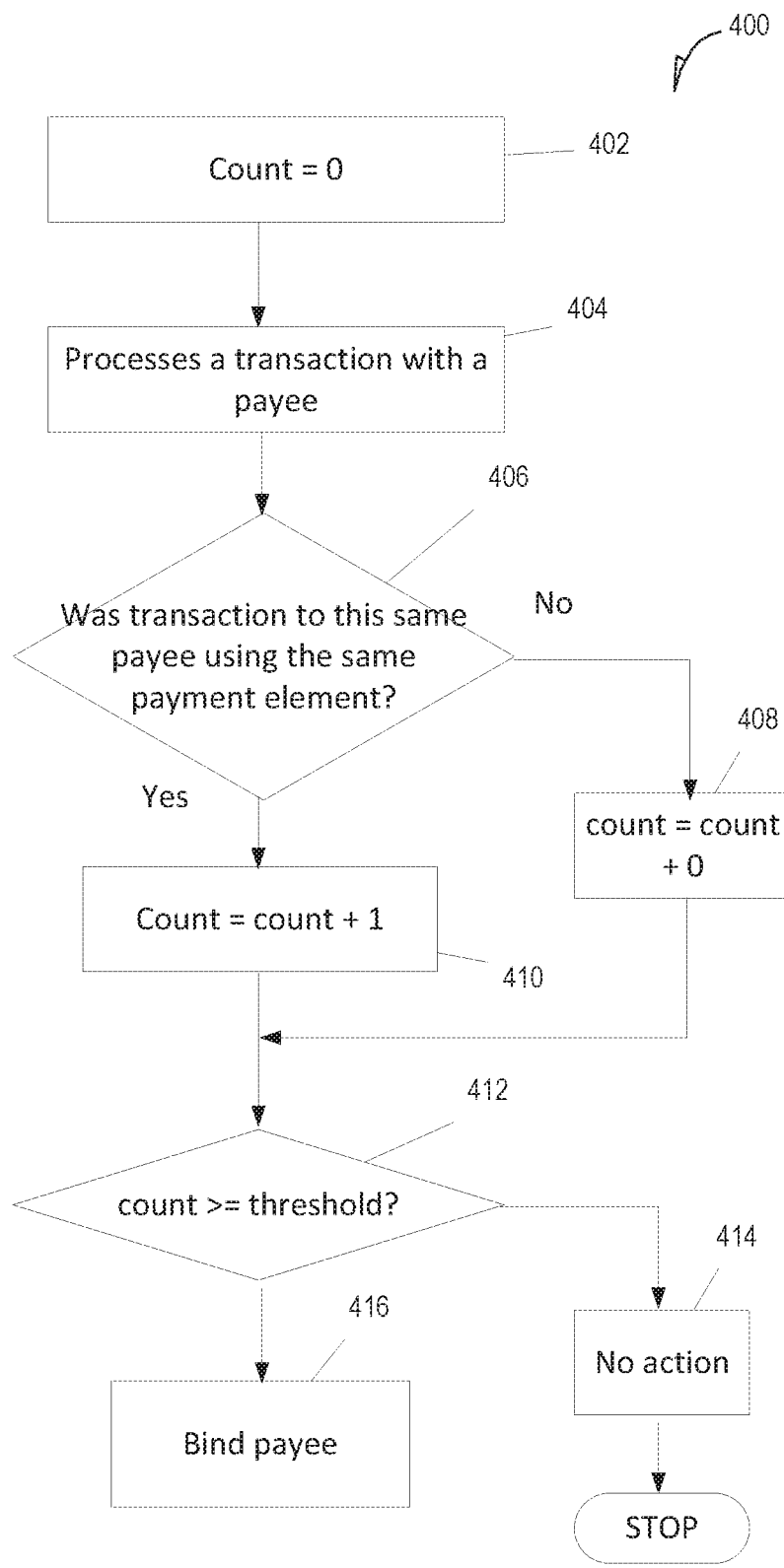
FIG. 4 shows a flowchart to present a user interface to bind a payment element with a payee, according to various examples.

FIG. 4 is a flowchart showing one example of a process flow 400 that can be executed by a mobile wallet 114 (FIG. 1) to bind payees to payment elements. Operations of the process flow 400 can be performed by elements of the environment 100, and reference is made to elements within the environment 100. Reference is further made to fields within the payment database table 300 (FIG. 3).

The example process flow 400 begins with operation 402 with the mobile wallet 114 initializing a count associated with a combination of a mobile wallet 114 element and a payee. For example, with reference to FIG. 3, the mobile wallet 114 can initialize a value in a count field 306 associated with the combination of "Credit card #2" and "Payee #1." In some embodiments, initializing the value in the count field 306 associated with a combination of a payment element and a payee occurs one time. In some embodiments, the initializing can occur periodically, or in response to a user request.

The example process flow 400 continues with operation 404, with the mobile wallet 114 receiving, from the POS device 110, an indication (e.g., an electronic message received via NFC from the POS or a message received over a cellular network) that a transaction has been completed between a payment element of the mobile wallet 114 and a payee associated with the POS device 110. The indication can include the identifier of the payee (e.g., as detailed in payee identifier field 303) and the payment element used with the payee. For example, the mobile wallet 114 can process a payment to "Payee #1" using "Credit card #2." In the context of operation 404, the mobile wallet 114 can process a payment upon the user accepting a payment total and upon confirming the payee through a UI (e.g., the UI 500 of FIG. 5) as described later herein.

In operation 406, the mobile wallet 114 can check whether the mobile wallet 114 element used in the transaction of operation 404 was used with that same payee in any previous transaction. The mobile wallet 114 can perform this checking by querying a database maintained by the mobile wallet provider 108 (FIG. 1) or other database accessible through the network 112 (FIG. 1). For example, the mobile wallet 114 can query the payment database table 300 (FIG. 3) using a structured query language (SQL) command that includes an identifier for the payment element (e.g., the payment element 304 field) and an identifier for the payee (e.g., the payee ID 303 field). If no results (e.g., a null set) are returned from this query, the mobile wallet 114 may determine that the respective payment element has not been previously used to complete transactions with the respective payee. If the payment element was not used before, in operation 408, the mobile wallet 114 can store identifying information for the payee and the payment element in a new record of the payment database table 300, with a count field 306 set equal to an initial value (e.g., a value of 0).

If the payment element was used with the payee before, in operation 410, the mobile wallet 114 can increase (e.g., increment) the count by, for example, updating the count field 306 in the payment database table 300.

The example process flow 400 continues with the mobile wallet 114 binding the payment element to the payee. The mobile wallet 114 can make the determination as to whether the payment element is to be bound to the payee using at least operations described below.

In operation 412, the mobile wallet 114 can determine whether a count of the number of transactions that have been completed with the payee, using the payment element, meets or exceeds a threshold. The mobile wallet 114 can determine the count based on the count field 306 of the record retrieved in the SQL query described with respect to operation 406 above, for example. An example method can including setting the threshold. The threshold can be a predetermined number set by policies (e.g., a financial institution policy or a mobile wallet provider policy) or inputs from the mobile wallet 114, a user, a mobile wallet provider 108, or other entity. If the count is lower than the threshold, in operation 414, the mobile wallet 114 may not take any action with respect to binding the payment element to the payee. If the count field 306 is at least equal to the threshold, in operation 416, the mobile wallet 114 can present a user interface, similar to user interface shown in FIG. 2 requesting user confirmation the payment element is to be bound to the payee. In other embodiments, the payee can be bound to the payment element automatically, without user input. If the payment element is to be bound (whether by user acceptance, automatically, or otherwise), the mobile wallet 114 can perform this binding by adding a record to a binding database table 700 (described later herein with respect to FIG. 7) to relate the payee with the payment element to be used for subsequent transactions between the payee and the payment element. Otherwise, the mobile wallet 114 can refrain from adding the record to the binding database table 700.

Figure 5:
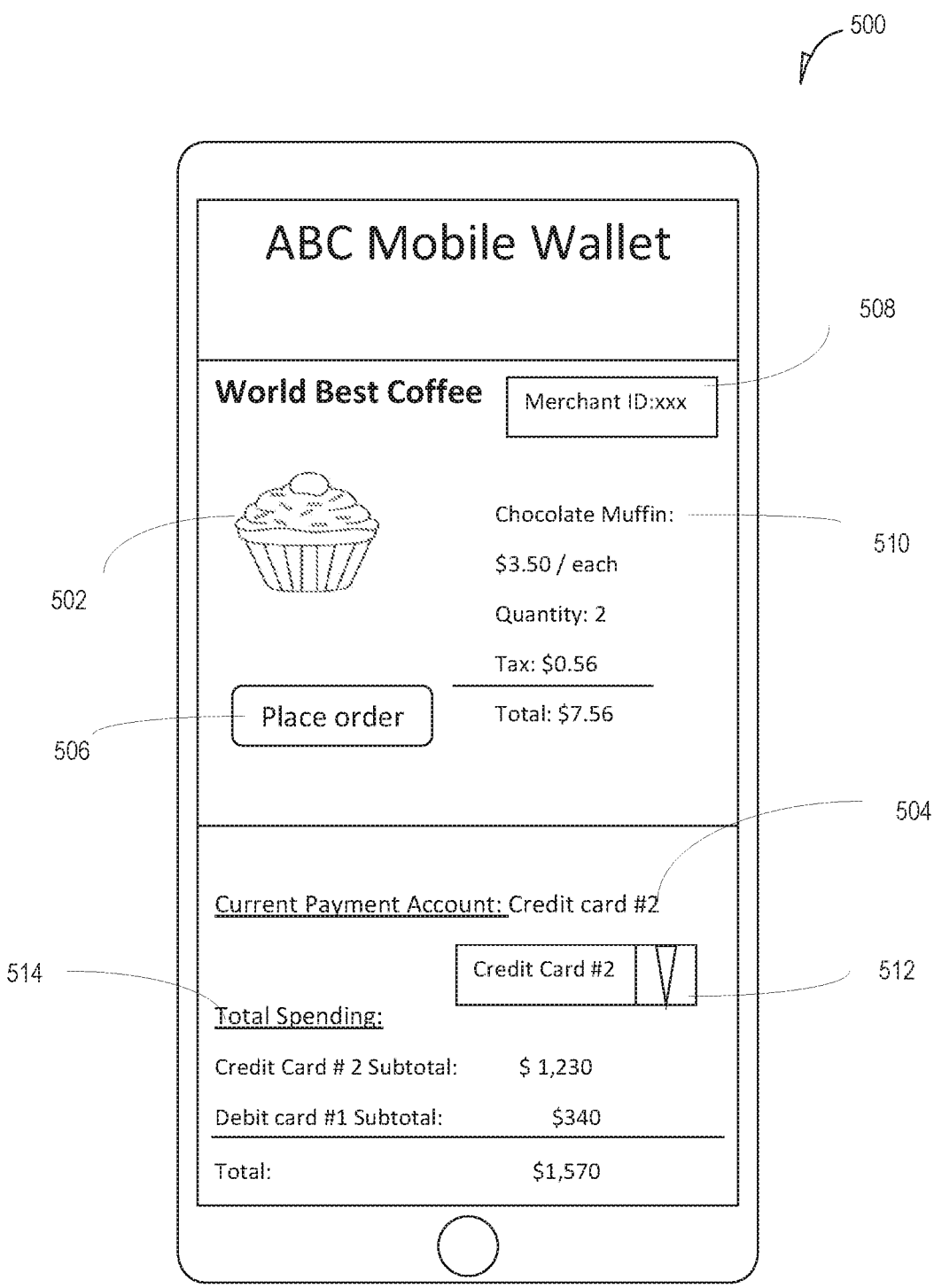
FIG. 5 is an example of a UI for a using a bound element, according to various examples.

Once a payment element has been bound to a payee, the mobile wallet 114 can present a user interface when a transaction is occurring or about to occur with that payee. FIG. 5 is an example of a UI 500 for a using a bound payment, according to various examples. An example mobile wallet, "ABC Mobile Wallet," presents that Credit Card #2 that was previously bound with World Best Coffee 120 using a method at least somewhat similar to the method described above with respect to FIG. 4. When a payee (e.g., "World Best Coffee") is bound with a payment element (e.g., Credit Card #2"), the mobile wallet 114 can present the payee with a depiction 502 of the product to purchase and the bound payment element 504 (e.g., Credit card #2).

The mobile wallet 114 user can touch the place order button 506 at the checkout to complete the purchase. The UI 500 can show the product description 510, price, and unique merchant ID 508, among other fields. The UI 500 can allow the user to change the payment account through a drop-down element 512 or other element, and shows total spending 514 on the payee. In one embodiment, the user can hide or unhide information regarding the payment element or any other information, or portions thereof. The mobile wallet 114 can use the unique merchant ID 508 in database queries to update, for example, the total spent at a payee, rewards points, etc.

Figure 6:
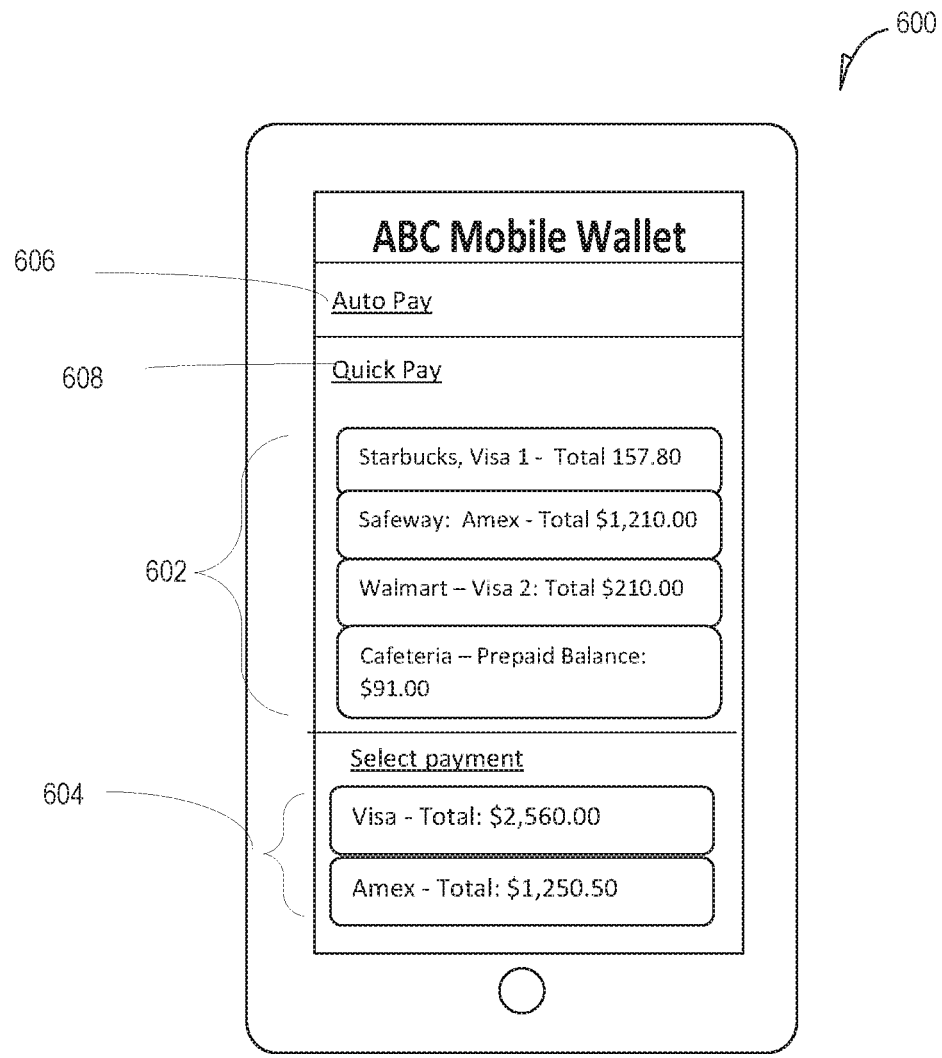
FIG. 6 is an example of a UI for a mobile wallet, according to various examples.

FIG. 6 is an example of a UI 600 for a mobile wallet (such as for the mobile wallet 114 of FIG. 1), according to various examples. The UI 600 shows a list 602 of bound payment elements. The UI 600 can also show total spending for payment elements over all payees, including payees not bound to any payment element. A mobile wallet 114 can comprise an automatic payment group 606, and a quick payment group 608. For clarity, the quick payment group 608 is shown in FIG. 6 and the automatic payment group 606 is hidden. When the mobile wallet 114 is viewed on a touch screen device, the user can touch the "Auto Pay" text to view payees in the automatic payment group 606.

The example quick payment group 608 can show a list or a portion of a list of payees having a corresponding bound payment elements enabled for quick pay. For example, the payee "Starbucks" is bound to the payment element having a nickname "Visa 1." The payee "Safeway" is bound to the payment element having a nickname "Amex." The payee "Walmart" is bound to the payment element having a nickname "Visa 2." The payee "Cafeteria" is configured for prepayment. Other information, such as a running total of amounts paid to the corresponding payee, can be displayed using the UI 600. For example, the user can scroll to view UI elements or information not displayable in one screen, or touch text for any items in list 602 or 604 to view other information regarding either the payee or payment element. The mobile wallet 114 can obtain the data shown in the UI 600 by performing queries against database tables relating payees and payment elements, for example, the binding database table 700 shown in FIG. 7.

FIG. 7 illustrates an example binding database table 700 for relating payees and payment elements bound to respective payees, according to various examples. As described earlier herein with respect to operation 416, the records in the binding database table 700 can be generated or edited as new payee/payment element pairs are created. The binding database table 700 can be stored in the data storage 116, or in a cloud computing system remotely from the mobile wallet 114. Representations of full or partial views of the binding database table 700 can also be displayed to the mobile wallet 114 user. Although feature 700 is referred to as a database table, feature 700 can be implemented using any suitable data structure including, for example, a relational database, a table, a list, etc.

Records stored in the binding database table 700 can include payee identification data including a payee name field 702, and a payee ID 704. The payee name field 702 can include nicknames, official business names, or payee names in any other format. The payee ID 704 can include account numbers, serial numbers, or other types of identifying strings. Records stored in the binding database table 700 can also include an identifier for the payment element 706 that has been bound to a payee in the payee name field 702. The identifier 706 can include a nickname assigned by the mobile wallet 114 user in some examples. Records stored in the binding database table 700 can include any other information regarding payees, bound payment accounts, etc. For example, the mobile wallet 114 can access the binding database table 700 to retrieve values for total spending 710, either per payee, per bound payment element, or according to any other criteria.

Similarly, the binding database table 700 can track rewards 712 accumulated per payee or per bound account. While fields 702, 704, 706, 708, 710, and 712 are shown in FIG. 7, it will be appreciated that the binding database table 700 can include any other fields pertaining to the mobile wallet 114. Furthermore, any of the fields 702, 704, 706, 708 or 710 can be foreign keys referencing other database tables such that the mobile wallet 114 can access any history, alerts, usage policies, or other data related to payees 702, bound payment elements 706, rewards 712, etc. In some embodiments, a payment element 706 can be bound to more than one payee 702, and a payee 702 can have more than one bound payment element 706.

When the example binding database table 700 is viewable by the user in a UI, that UI can include a UI element 714 (e.g., an icon, or button, etc.) that, when selected by the mobile wallet 114 user, can launch a window to change the payment method. For example, according to FIG. 7, "Payee #1" is currently bound to "Credit card #2" with payment being processed automatically without intervention by the mobile wallet 114 user. By clicking the UI element 714, the mobile wallet 114 user can change the bound account to, for example, "Credit card #3," and/or remove the automatic payment option.

Mobile wallet elements can include non-payment elements in addition to payment elements. Non-payment elements can be and/or reference user accounts, memberships, etc. that do not include funds for making a payment. Examples of non-payment wallet elements include employee cards, insurance cards, membership cards, and driver's licenses. Non-payment wallet elements can also be bound to service providers or other entities using any of the methods described earlier herein. For instance, an employee can tap his mobile wallet with a door lock with NFC and the mobile wallet presents the employee card (i.e., non-payment element) automatically which is bounded to the door lock to open the door.

The mobile wallet 114 can present a visual indication of the total spending that has been done with respect to a given payee using a given bound payment element. Apparatuses and systems according to some embodiments can alert the user, through user interface elements such as alert boxes, when total spending on a payee with an automatic payment reaches a predefined amount. The mobile wallet 114 user can configure preferences such as predefined amounts, security, radius for which location dependency applies, etc. through UIs provided by the mobile wallet 114, or through a financial institution's website, for example.

Figure 8:
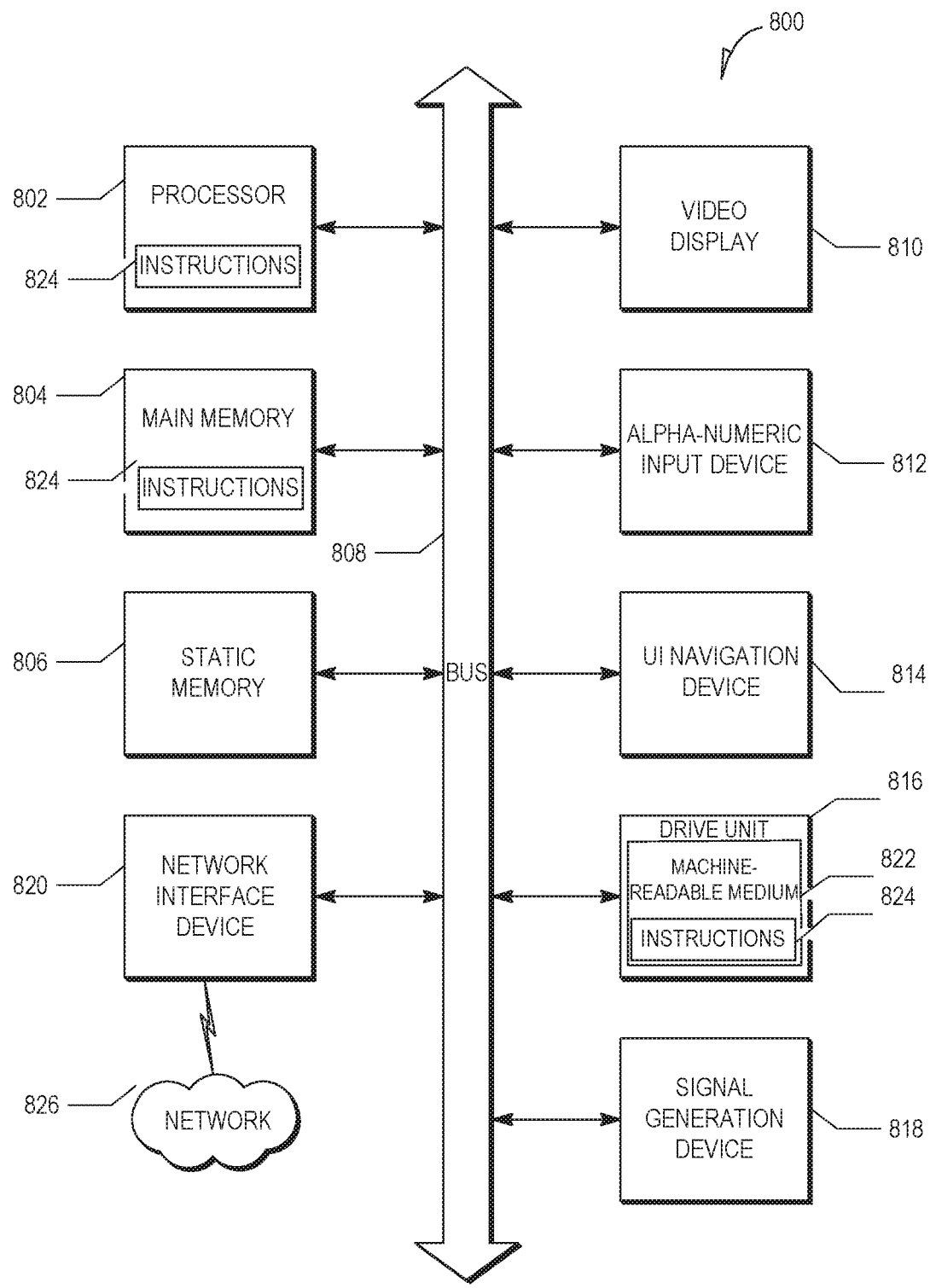
FIG. 8 is a block diagram illustrating a machine in the example form of a computer system, within which a set or sequence of instructions can be executed to cause the machine to perform any one of the methodologies discussed herein, according to various examples.

FIG. 8 is a block diagram illustrating a machine in the example form of a computer system 800, within which a set or sequence of instructions can be executed to cause the machine to perform any one of the methodologies discussed herein, according to an example embodiment. In alternative embodiments, the machine operates as a standalone device or can be connected (e.g., networked) to other machines. In a networked deployment, the machine can operate in the capacity of either a server or a client machine in server-client network environments, or it can act as a peer machine in peer-to-peer (or distributed) network environments. The machine can be a personal computer (PC), a tablet PC, a hybrid tablet, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 800 includes at least one processor 802 (e.g., a central processing unit (CPU), a graphics processing unit (GPU) or both, processor cores, compute nodes, etc.), a main memory 804 and a static memory 806, which communicate with each other via a link 808 (e.g., bus). The computer system 800 can further include a video display unit 810, an alphanumeric input device 812 (e.g., a keyboard), and a user interface (UI) navigation device 814 (e.g., a mouse). In one embodiment, the video display unit 810, input device 812 and UI navigation device 814 are incorporated into a touch screen display. The computer system 800 can additionally include a storage device 816 (e.g., a drive unit), a signal generation device 818 (e.g., a speaker), a network interface device 820, and one or more sensors (not shown), such as a global positioning system (GPS) sensor, compass, accelerometer, or other sensor.

The storage device 816 includes a non-transitory machine-readable storage medium 822 on which is stored one or more sets of data structures and instructions 824 (e.g., software) embodying or utilized by any one or more of the methodologies or functions described herein. The instructions 824 can also reside, completely or at least partially, within the main memory 804, static memory 806, and/or within the processor 802 during execution thereof by the computer system 800, with the main memory 804, static memory 806, and the processor 802 also constituting machine-readable media.

While the machine-readable medium 822 is illustrated in an example embodiment to be a single medium, the term "machine-readable medium" can include a single medium or multiple media (e.g., a centralized or distributed database, and/or associated caches and servers) that store the one or more instructions 824. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and compact disc read-only memory (CD-ROM) and digital versatile disc-read-only memory (DVD-ROM) disks.

The instructions 824 can further be transmitted or received over a communications network 826 using a transmission medium via the network interface device 820 utilizing any one of a number of well-known transfer protocols (e.g., hypertext transfer protocol (HTTP)). Examples of communication networks include a local area network (LAN), a wide area network (WAN), the Internet, mobile telephone networks, plain old telephone (POTS) networks, and wireless data networks (e.g., Wi-Fi, 3G, and 4G long term evolution (LTE)/LTE-Advanced (LTE-A) or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above description is intended to be illustrative, and not restrictive. For example, the above-described examples (or one or more aspects thereof) can be used in combination with others. Other embodiments can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein as embodiments can feature a subset of said features. Further, embodiments can include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A method of using a mobile wallet, the method comprising:
   receiving an indication that a transaction has been completed with a payee using a payment element of the mobile wallet;
   identifying a current location of the payee;
   executing a query, on a payment database table, that identifies the payee and the payment element to determine that the payment element has previously been used to complete transactions with the payee at the current location;
   in response to the determination that the payment element has previously been used to complete transactions, determining that a count of transactions completed with the payee using the payment element meets a threshold; and
   based on the determination of the count meeting the threshold, binding the payment element to the payee.

2. The method of claim 1, wherein identifying the location includes detecting a location of a point of sale (POS) device associated with the payee.

3. The method of claim 2, further comprising:
   automatically submitting a payment to the payee when the payment element is within a radius of the POS device.

4. The method of claim 2, wherein identifying the location includes using a global positioning system of a mobile device associated with the mobile wallet.

5. The method of claim 2, wherein identifying the location includes detecting a radio frequency identifier tag associated with the payee.

6. The method of claim 2, wherein identifying the location includes accessing a wireless communications connection provided by the payee.

7. The method of claim 1, further comprising:
   providing a user interface input for selecting a payment element based on the current location of the payee.

8. The method of claim 1, wherein binding the payment element comprises:
   adding a record to a binding database table to relate the payee with the payment element for subsequent transactions between the payee and the payment element.

9. The method of claim 1, wherein the mobile wallet communicates with a POS device wirelessly to receive the indication.

10. The method of claim 1, wherein mobile wallet communicates with a POS device by physical contact to receive the indication.

11. A non-transitory machine-readable storage medium including instructions that when executed by a computer, cause the computer to perform operations of:
    receiving an indication that a transaction has been completed with a payee using a payment element of a mobile wallet;
    identifying a current location of the payee;
    executing a query, on a payment database table, that identifies the payee and the payment element to determine that the payment element has previously been used to complete transactions with the payee at the current location;
    in response to the determination that the payment element has previously been used to complete transactions, determining that a count of transactions completed with the payee using the payment element meets a threshold; and
    based on the determination of the count meeting the threshold, binding the payment element to the payee.

12. The non-transitory machine-readable storage medium of claim 11, wherein identifying the location includes detecting a location of a point of sale (POS) device associated with the payee.

13. The non-transitory machine-readable storage medium of claim 12, wherein the operations further include:
    automatically submitting a payment to the payee when the payment element is within a radius of the POS device.

14. The non-transitory machine-readable storage medium of claim 12, wherein identifying the location includes using a global positioning system of a mobile device associated with the mobile wallet.

15. The non-transitory machine-readable storage medium of claim 12, wherein identifying the location includes detecting a radio frequency identifier tag or accessing a wireless communications system associated with the payee.

16. A system comprising:
    at least one processor; and
    at least one memory storing instructions that, when executed by the at least one processor, configure the at least one processor to:
    receive an indication that a transaction has been completed with a payee using a payment element of a mobile wallet;
    identify a current location of the payee;
    execute a query, on a payment database table, that identifies the payee and the payment element to determine that the payment element has previously been used to complete transactions with the payee at the current location;
    in response to the determination that the payment element has previously been used to complete transactions, determine that a count of transactions completed with the payee using the payment element meets a threshold; and
    based on the determination of the count meeting the threshold, bind the payment element to the payee.

17. The system of claim 16, wherein identifying the location includes detecting a location of a point of sale (POS) device associated with the payee.

18. The system of claim 17, further comprising a global positioning system (GPS), and wherein identifying the location includes using the GPS to detect location of the system.

19. The system of claim 17, wherein the at least one processor and POS device communicate wirelessly.

20. The system of claim 19, wherein identifying the location includes accessing a wireless communications connection provided by the payee.

21. The system of claim 17, further comprising:
    a touch screen display; and
    at least two antennas, one of the at least two antennas for performing near field communication (NFC) with the POS device.

* * * * *